United States Patent
Waggoner et al.

(10) Patent No.: US 9,018,315 B2
(45) Date of Patent: Apr. 28, 2015

(54) MANUFACTURING PROCESS FOR LIQUID CRYSTALLINE POLYMER

(71) Applicant: Ticona LLC, Florence, KY (US)

(72) Inventors: Marion Glen Waggoner, Hockessin (DE); Richard Alan Jackson, Hockessin (DE)

(73) Assignee: Ticona LLC, Florence, KY (US)

( * ) Notice: Subject to any disclaimer, the term of this patent is extended or adjusted under 35 U.S.C. 154(b) by 0 days.

(21) Appl. No.: 14/250,423

(22) Filed: Apr. 11, 2014

(65) Prior Publication Data

US 2014/0243481 A1  Aug. 28, 2014

Related U.S. Application Data

(63) Continuation of application No. 10/934,160, filed on Sep. 2, 2004, now Pat. No. 8,697,817.

(60) Provisional application No. 60/537,539, filed on Jan. 20, 2004, provisional application No. 60/500,087, filed on Sep. 4, 2003.

(51) Int. Cl.
  *C08G 63/78* (2006.01)
  *C08G 63/60* (2006.01)
  *C08G 63/91* (2006.01)

(52) U.S. Cl.
  CPC ............ *C08G 63/916* (2013.01); *C08G 63/605* (2013.01); *C08G 63/91* (2013.01)

(58) Field of Classification Search
  CPC ..... C08G 63/916; C08G 63/605; C08G 63/91
  USPC .......................................... 525/448, 437, 450
  See application file for complete search history.

(56) References Cited

U.S. PATENT DOCUMENTS

| | | |
|---|---|---|
| 4,720,424 A | 1/1988 | Eickman et al. |
| 4,841,014 A | 6/1989 | Brodowski |
| 5,525,700 A | 6/1996 | Samuels et al. |
| 5,672,426 A | 9/1997 | Makhija et al. |
| 5,798,432 A | 8/1998 | Lee et al. |
| 2002/0013424 A1* | 1/2002 | Soelch .......................... 525/434 |

* cited by examiner

*Primary Examiner* — Kelechi Egwim
(74) *Attorney, Agent, or Firm* — Dority & Manning, P.A.

(57) ABSTRACT

The properties of a liquid crystalline polymer (LCP) containing ester linkages and made in the presence of an excess of diol are improved by treating the LCP with a dicarboxylic acid at elevated temperature. The resulting LCPs are useful as molding resins and for films.

19 Claims, No Drawings

MANUFACTURING PROCESS FOR LIQUID CRYSTALLINE POLYMER

CROSS-REFERENCE TO RELATED APPLICATION

The present application is a continuation of U.S. application Ser. No. 10/934,160, filed on Sep. 2, 2004, which claims filing benefit of U.S. Provisional Application No. 60/537,539, filed Jan. 20, 2004 and U.S. Provisional Application No. 60/500,087, filed Sep. 4, 2003, which are incorporated herein in their entirety by reference thereto.

FIELD OF THE INVENTION

The present invention is directed to processes for producing liquid crystalline polymers. The processes provide liquid crystalline polymers having improved properties. The processes include reacting dicarboxylic acids with aliphatic esters of diols and optionally hydroxycarboxylic acids, wherein an excess of diol (ester) is present, and treating the resulting LCP with a dicarboxylic acid.

BACKGROUND

Liquid crystalline polymers (LCPs) are items of commerce, thousands of tons being made annually. They are used in a myriad of ways, as molding resins and in films, for example to make electrical and electronic parts, automotive parts, and medical parts. LCPs are most often provided as polyesters, but also available as poly(ester-amides). The condensation reaction to form the polyester linkages is most commonly done by condensing at elevated temperatures one or more dicarboxylic acids with the aliphatic esters of one or more diols and/or the aliphatic monoesters of one or more hydroxycarboxylic acids. Although the aliphatic esters can be "preformed", that is, the ingredients added to the polymerization process as aliphatic esters, for economic reasons the aliphatic esters are usually made in situ by adding an appropriate amount of an aliphatic carboxylic anhydride to the polymerization mixture to form the aliphatic ester(s).

Typically all of the monomers needed to form the LCP are added to a reactor together with an amount of aliphatic carboxylic anhydride, usually acetic anhydride, to form ester groups with all of the hydroxyl groups of the diols and hydroxycarboxylic acids monomer present in the ester groups. The mixture is heated to complete ester formation and the carboxylic acid formed is removed by distillation. Heating is continued, with concomitant distillation of carboxylic acid, to perform the condensation polymerization, and finally usually vacuum is applied to complete the polymerization. Alternately melt polymerization can be discontinued at some point and the (pre)polymer further polymerized to the desired molecular weight using so-called solid state polymerization. It may be desirable, particularly when one of the diols used is somewhat volatile, to use an excess of the diol in the polymerization, to make up for any possible losses of the diol (or its diester) by inadvertent volatilization and removal from the polymerization. However, the LCPs obtained may not have optimal properties for desired uses, and in particular can be more brittle than desired for some applications.

U.S. Pat. No. 6,294,618 describes the treatment of LCPs with various functional compounds to reduce the viscosity of the LCPs.

LCPs having improved properties, such as tensile or flexural elongation, are desirable.

SUMMARY OF THE INVENTION

The present invention is directed to processes for making liquid crystalline polymers (LCPs). There is no mention of LCPs made with an excess of diol present, nor of an One aspect of the present invention is, a process comprising:

(a) forming a liquid crystalline polymer from ingredients comprising one or more first dicarboxylic acids, aliphatic diesters of one or more first diols and optionally aliphatic esters of one or more hydroxycarboxylic acids; and (b) contacting the liquid crystalline polymer with about 2 to about 200 milliequivalents per kg of said liquid crystalline polymer of a second dicarboxylic acid, at a temperature sufficient to cause reaction of the second dicarboxylic acid with the liquid crystalline polymer for a period of time sufficient to cause at least about a 10% increase in the tensile elongation of the liquid crystalline polymer;

provided that the molar ratio of the total of first diols present to the total of first dicarboxylic acids is 1.01 or more.

DETAILED DESCRIPTION

Herein certain terms are used, and they are described below.

By a liquid crystalline polymer is meant that the polymer is anisotropic in the TOT, or any similar test method, as described in U.S. Pat. No. 4,075,262, which is hereby incorporated herein by reference. Preferred polymers are liquid crystalline polyesters, and it is further preferred that the liquid crystalline polyesters be aromatic polyesters. By aromatic polyesters is meant that the carbon and oxygen atoms at the ends of the group —C(O)O— of the ester linkages are each bonded to carbon atoms that are part of aromatic rings.

By a diol is meant an organic compound having two hydroxyl groups, and preferably no other functional groups that can form ester linkages, Preferred diols are aromatic diols, in which both hydroxyl groups are bound to carbon atoms of one or two different aromatic rings.

By a dicarboxylic acid is meant an organic compound having two carboxyl groups, and preferably no other functional that can form ester linkages. Preferred carboxylic acids are aromatic dicarboxylic acids, in which both carboxyl groups are bound to carbon atoms of one or two different aromatic rings.

By a hydroxycarboxylic acid is meant an organic compound having one hydroxyl group and one carboxyl group, and preferably no other functional groups which can form ester linkages. Preferred hydroxycarboxylic acids are aromatic hydroxycarboxylic acids, in which the hydroxyl and carboxyl groups are bound to carbon atoms of one or two different aromatic rings.

By an aliphatic diester of a dial is meant a diester formed from the diol and 2 carboxyl groups ($R^1CO_2$—, wherein $R^1$ is alkyl or substituted alkyl) derived from aliphatic carboxylic acids. By an aliphatic ester of a hydroxycarboxylic acid is a meant a monoester formed from the hydroxycarboxylic acid and one carboxyl group derived from an aliphatic carboxylic acid. Preferably some or all of such esters are acetates.

By "tensile elongation" is meant the elongation to break when measured by ASTM Method D638 using an extension rate of 5.1 mm/min (0.2 in/min), and a Type I bar. Measurements are made using strain gauges to accurately measure the usually small strain to break.

Useful dicarboxylic acids for treating the LCP include terephthalic acid, 2,6-napthalenedicarboxylic acid, isophthalic acid, 4,4'-bibenzoic acid, 2-methylterephthalic acid, and adipic acid. Preferred dicarboxylic acids are isophthalic acid, 2,6-naphthalene dicarboxylic acid, and terephthalic acid, and terephthalic acid and 2,6-naphthalene dicarboxylic acid are especially preferred. Other preferred second dicarboxylic acids are aromatic dicarboxylic acids, in which both carboxyl groups are bound directly to an to aromatic ring carbon atom.

Useful dicarboxylic acids as monomers for the LCP include terephthalic acid, isophthalic acid, 2,6-naphthalenedicarboxylic acid, 4,4'-bibenzoic acid, and 1,8-naphthalenedicarboxylic acid. Useful diols as monomers for the LCP include ethylene glycol, hydroquinone, resorcinol, 4,4'-biphenol, 2,6-dihydroxynaphthalene, 1,8-dihydroxynaphthalene, bisphenol-A, and bisphenol-S. Hydroquinone and 4,4'-biphenol are preferred dials, and hydroquinone is especially preferred. Useful hydroxycarboxylic acids as monomers for the LCP include 4-hydroxybenzoic acid, 6-hydroxy-2-napthoic acid, and t-butyl-4-hydroxybenzoic acid. Preferred hydroxycarboxylic acids are 4-hydroxybenzoic acid and 6-hydroxy-2-napthoic acid, and 4-hydroxybenzoic acid is especially preferred.

When the LCP is made, the molar ratio of total diols to total dicarboxylic acids 1.01 or more (the diols are present in at least 1% molar excess), preferably 1.02 or more and especially preferably 1.03 or more. Preferably the molar ratio of total diols to total dicarboxylic acids is about 1.5 or less, more preferably about 1.10 or less. Any lower limit and any upper limit of dials can be combined to form a preferred range.

In one preferred method of preparing the LCP, the LCP is prepared completely in the melt, and then treated with the dicarboxylic acid. In another preferred method, the LCP is prepared initially in the melt and then the molecular weight of the LCP is raised in a solid state polymerization. After the solid state polymerization the LCP is treated with the dicarboxylic acid.

The treatment of the LCP with the dicarboxylic acid is most effectively carried out when the LCP is in the melt. In one preferred method the LCP is melted and mixed with the dicarboxylic acid in a melt mixer used for polymers such as a single or twin screw extruder, or kneader. The mixture is heated to a temperature above the melting point of the LCP at which the elongation of the LCP is increased by a desired amount in the time the mixture is being heated and mixed in the mixer. While it is not intended that the present invention be bound by any particular theory or mechanism, it is believed that the elongation of the LCP is increased when the dicarboxylic acid reaches a temperature at which it can react with other species present in the melt. The LCP and dicarboxylic acid can be premixed as solids before being put into the mixer, or can be added separately and mixed in the mixer.

Other materials such as fillers, reinforcing agents, lubricants, pigments, and other materials known for use in making LCPs can be mixed into the LCP at the same time as the dicarboxylic acid. In test measurements, the elongation of the LCP (including the other ingredients mixed into the LCP) is compared to that of an LOP having the same composition and made in the same way, but without the dicarboxylic being present. Alternatively, a composition containing the LCP and other ingredients can be prepared first and then treated with the dicarboxylic acid. The elongation of the resulting LCP is compared to that of the same composition treated in the same way but without dicarboxylic acid being added. "Pure" LCP canbe treated with dicarboxylic acid and the elongation thereof compared to that of "pure" LCP treated in the same manner but without dicarboxylic acid.

Examples of useful other ingredients include glass fiber, milled glass fiber, hollow or solid glass spheres, mica, talc, titanium dioxide, carbon black, carbon fiber, and aramid fiber, and lubricants such as polyethylene waxes.

The amount of (second) dicarboxylic acid used is at least about 2, and preferably at least about 5 (meq)/kg LCP (based on only the LCP) The amount of (second) dicarboxylic acid added in the treatment of the LOP is about 200 or less, preferably about 100 or less, and more preferably about 50 or less (meq)/kg LCP (LCP only in the composition). "Equivalents" means equivalents of carboxylic acid functionality, and one millimole of dicarboxylic acid contains two meq of carboxyl groups. Any lower limit and any upper limit of dicarboxylic acid contents can be combined to form a preferred range.

Other types of difunctional compounds can be used in addition to the dicarboxylic acid used for the treatment of the LCP. Functionalities in such compounds can include hydroxy, carboxylate, ester, and primary or secondary amine, and hydroxy is preferred. Useful hydroxy compounds include diols and water (by definition herein a difunctional compound), and of the diols aromatic diols are especially preferred. Useful aromatic diols include hydroquinone, resorcinol, 4,4'-biphenol, 2,6-dihydroxynaphthalene, 1,8-dihydroxynaphthalene, bisphenol-A, and bisphenol-S. Such preferred aromatic diols are hydroquinone and 4,4'-biphenol, and 4,4'-biphenol is especially preferred.

Water is also an especially preferred hydroxy compound, and can be used alone or in combination with a dial, especially an aromatic dial. The water can be added to the process as water, or in a form that under process conditions generates water. For example, the water can be added as a hydrate or other compound that under the process (temperature) conditions "loses" water. Such hydrates and other compounds include aluminum oxide trihydrate, copper sulfate pentahydrate, barium chloride dihydrate, and calcium sulfate dihydrate.

Preferably the total molar amount of other difunctional compound(s) (not including water, if present) does not exceed twice the total molar amount of the dicarboxylic acid added to treat the LCP, and is more preferably about 20 to about 100 percent (by moles) of the amount of such dicarboxylic acid added. If water is present, it can be added in much larger amounts compared to the total molar amount of the second dicarboxylic acid added, independent of and not including any other difunctional compound added. If water is used, it is preferably used in a molar ratio of 0.2:1 to about 10:1 to the dicarboxylic acid added. That is, the amount of water is preferably from about 20 to about 1000 mole percent based on the number of moles of the second dicarboxylic acid. The amount of water in a hydrate is taken only as the amount that is "freed" i.e., released, under the process conditions. For example, a trihydrate may yield only two moles of water per mole of trihydrate under certain temperature conditions. Larger amounts of water may be needed because not all the water added may be effective in the process. If added as water, rather than generated in situ, much if not most of the water may be lost because it may vaporize and/or not be very soluble in the process ingredients. The same may be true (possibly to a lesser extent) for water contained in hydrates. The amount of water (or hydrate, since water may be present as water of hydration) needed to achieve a certain viscosity reduction under a given set of process conditions can be determined by simple experimentation. It has been noted that the amount of water (hydrate required is determined to some extent by the scale of the equipment used and/or the "tightness" (the propensity to lose water vapor) of that equipment.

When present in moderate amounts, such as the amounts recited hereinabove, other difunctional compounds, especially hydroxy compounds, are believed to lower the melt viscosity of the LCP without greatly adversely affecting other physical properties of the LCP. Lower melt viscosity is advantageous in certain melt forming operations such as injection molding, since it can allow for easier and/or more complete mold filling, especially if the mold has narrow or thin openings or passageways.

When the LCP is treated with the dicarboxylic acid, the tensile elongation of the LCP is preferably increased by at least about 10 percent, more preferably by at least about 20 percent. The percentage elongation increase is calculated using the equation $$\% = \frac{(EAT - EBT) \times 100}{EBT}$$

wherein EAT is percent tensile elongation after treatment (with the dicarboxylic acid), and EBT is percent tensile elongation before treatment.

The LCP is useful as a molding resin, for example, for making shaped parts useful for electrical and electronic apparatuses, in automotive vehicles, in medical devices and in films for use in packaging. Shaped parts can be made by melt molding the LCP containing composition, for example by injection molding, extrusion, blow molding, ram injection molding, rotational molding, and compression molding. Films may be made extrusion through a straight die or through a rotating die.

EXAMPLES

In the following Examples the melt viscosities were determined using a Kayness Model 8052 viscometer, Kayness Corp., Morgantown Pa., U.S.A., at 350° C. (unless otherwise noted) and a shear rate of 1000/sec. Tensile properties were determined by the method of ASTM D638, using the Type I test sample shape, at a sample thickness of 0.32 cm (⅛"), and an elongation rate of 0.51 cm/min (0.2 inches/min), The tests were run using strain gauges so that the usually small strains to break could be measured accurately.

In the Examples, except where noted, all parts are parts by weight.

In the Examples, the following materials are used:
ATH—alumina trihydrate
BP—4,4'-biphenol
GF Vetrotex® 991 glass fiber, available from Saint-Gobain Vetrotex America, Valley Forge, Pa. 19482, USA.
LCP1—a liquid crystalline polymer made from hydroquinone/terephthalic acid/2,6-naphthalenedicarboxylic acid/4-hydroxybenzoic acid 100/30/70/150 molar parts, wherein the initial ratio of hydroquinone to dicarboxylic acids was 1.05, and acetic anhydride was added to the polymerization to form aliphatic acetates in situ
LCP2—a liquid crystalline polymer as LCP1, but polymerized to a higher molecular weight prior to compounding
Lube—Licowax®V PE190 polyethylene wax, available from Clarient Corp., Charlotte, N.C. 28205, USA.
NDA—2,6-naphthalene dicarboxylic acid
MV—melt viscosity, in Pas at 1000 see shear rate
Ten. Elong.—tensile elongation to break, %
Ten, Mod.—tensile modulus, GPa
Ten, Str.—tensile strength, MPa
$TiO_2$—TiPure® R-100 titanium dioxide available from E. I. DuPont de Nemours & Co., Inc., Wilmington, Del. 19898, USA.
TPA—terephthalic acid Examples 1-11 and Comparative Example A-E All of the compositions contained 2.0% $TiO_2$ (Example 11 had 4.0% $TiO_2$), 0.2% Lube, 45.0% GE, the amounts (percent by weight based on the total composition) of BP and TPA indicated in Table 1, and the remainder LCP1. The compositions were mixed on a 30 mm Werner and Pfleiderer twin screw extruder at a screw speed of 275 rpm. Barrel temperatures were 360, 370, 370, 320, 300, 300, 320, 330° C. (barrels 2-8 and the die) for Examples 1-7 and comparative Examples A and B, and 310° C. for barrels 2-8, (die 330° C.) for Examples 8-11 and comparative Examples C-E. The compositions were pelletized upon exiting from the extruder. The pellets were molded into test pieces on a 1.5 oz. Arberg injection molding machine. Barrel temperatures were 330° C. for Examples 1-7 and comparative Examples A and B, and 320° C. for Examples 8-11 and comparative Examples C-E. Mold temperatures were all 70° C. The melt viscosities of the compositions were determined, as were the tensile properties, and the results reported in Table 1.

TABLE 1

| Ex. | TPA | BP | MV | Ten. Mod. | Ten. Str. | Ten. Elong. |
|---|---|---|---|---|---|---|
| A | 0.0 | 0.0 | 36 | 15.3 | 116 | 2.4 |
| B | 0.0 | 0.2 | 22 | 13.5 | 113 | 2.4 |
| 1 | 0.4 | 0.0 | 28 | 11.0 | 108 | 3.7 |
| 2 | 0.6 | 0.0 | 19 | 11.4 | 107 | 3.7 |
| 3 | 0.5 | 0.1 | 21 | 12.0 | 107 | 3.5 |
| 4 | 0.4 | 0.2 | 22 | 12.7 | 107 | 3.5 |
| 5 | 0.1 | 0.1 | 20 | 12.6 | 123 | 3.4 |
| 6 | 0.2 | 0.2 | 20 | 13.1 | 112 | 3.5 |
| 7 | 0.3 | 0.3 | 17 | 12.5 | 110 | 3.4 |
| C | 0.0 | 0.0 | 41 | 13.0 | 114 | 3.1 |
| D | 0.0 | 0.3 | 20 | 12.0 | 106 | 3.0 |
| E | 0.0 | 0.6 | 11 | 13.0 | 102 | 2.6 |
| 8 | 0.8 | 0.0 | 19 | 10.3 | 113 | 3.9 |
| 9 | 0.4 | 0.2 | 25 | 11.2 | 115 | 3.6 |
| 10 | 0.4 | 0.4 | 14 | 10.8 | 118 | 4.0 |
| 11 | 0.4 | 0.4 | 15 | 12.0 | 115 | 4.1 |

Testing of flexural properties showed trends parallel to those obtained in tensile testing. Despite having lower melt viscosities than the corresponding compositions in which TPA nor BP were present, the compositions containing TPA, whether BP was present or not, had a higher tensile elongation to break than the compositions not containing TPA or containing only BP. This indicates that the compositions containing TPA were tougher than the other compositions. In addition compositions that contained both TPA and BP were somewhat lighter (whiter) in color.

Examples 12-19 and Comparative Example F

All of the compositions contained 2.0 $TiO_2$, 0.2% Lube, 45.0% GF, the amounts of NDA, BP and ATH (in weight percent of the total composition) indicated in Table 2, and the remainder LCP2. The compositions were mixed on a 30 mm Werner and Pfleiderer twin screw extruder at a screw speed of 225 rpm. Barrel temperatures were 360, 360, 360, 360, 360, 330, 330, 330, 330° C. (barrels 2-9 and the die). The compositions were pelletized upon exiting from the extruder. The pellets were molded into test pieces on a 1.5 oz, Arberg injection molding machine. Barrel temperatures were 330° C. and mold temperatures were all 70° C. The melt viscosities (measured at 340° C.) of the compositions were determined, as were the tensile properties, and the results reported in Table 2.

TABLE 2

| Ex. | NDA | BP | ATH | MV | Ten Mod | Ten Str | Ten Elong |
|-----|------|------|------|----|---------|---------|-----------|
| F   | 0.00 | 0.00 | 0.00 | 54 | 15.3    | 125     | 3.2       |
| 12  | 0.06 | 0.00 | 0.00 | 58 | 16.2    | 136     | 4.1       |
| 13  | 0.06 | 0.06 | 0.00 | 47 | 15.0    | 133     | 3.8       |
| 14  | 0.06 | 0.18 | 0.00 | 45 | 15.3    | 110     | 2.7       |
| 15  | 0.06 | 0.00 | 0.02 | 52 | 16.8    | 131     | 3.7       |
| 16  | 0.06 | 0.00 | 0.06 | 40 | 16.5    | 136     | 4.0       |
| 17  | 0.06 | 0.00 | 0.08 | 41 | 16.1    | 134     | 3.9       |
| 18  | 0.06 | 0.06 | 0.03 | 38 | 16.7    | 132     | 3.5       |
| 19  | 0.06 | 0.06 | 0.06 | 37 | 16.5    | 136     | 3.8       |

What is claimed is:

1. A treated liquid crystalline polymer composition comprising:
   (a) a liquid crystalline polymer contains repeat units derived from one or more first dicarboxylic acids, one or more first diols, and optionally one or more hydroxycarboxylic acids; and
   (b) a treatment composition comprising a first type of difunctional compound and a second type of difunctional compound, wherein the first type of difunctional compound is a second dicarboxylic acid and wherein the second type of difunctional compound is a second diol;
   wherein the treated liquid crystalline polymer composition exhibits a tensile elongation that is at least about 10% greater than a tensile elongation of the liquid crystalline polymer.

2. The treated liquid crystalline polymer composition of claim 1, wherein the molar ratio of the total of first diols present to the total of first dicarboxylic acids present is 1.01 or more.

3. The treated liquid crystalline polymer composition of claim 2, wherein the molar ratio is from about 1.02 to about 1.10.

4. The treated liquid crystalline polymer composition of claim 1, wherein from about 2 to about 200 milliequivalents per kg, based on the liquid crystalline polymer, of a second dicarboxylic acid are present in the treatment composition.

5. The treated liquid crystalline polymer composition of claim 1, wherein the first dicarboxylic acid is terephthalic acid, isophthalic acid, or a combination thereof; the first diol is 4-4'-biphenol; and the hydroxycarboxylic acid is 4-hydroxybenzoic acid.

6. The treated liquid crystalline polymer composition of claim 1, wherein the second dicarboxylic acid is an aromatic dicarboxylic acid.

7. The treated liquid crystalline polymer composition of claim 1, wherein the second dicarboxylic acid is one or more of terephthalic acid, 2,6-napthalene dicarboxylic acid, isophthalic acid, 4,4'-bibenzoic acid, 2-methylterephthalic acid, and adipic acid.

8. The treated liquid crystalline polymer composition of claim 1, wherein the second dicarboxylic acid is one or both of terephthalic acid and 2,6-naphthalene dicarboxylic acid.

9. The treated liquid crystalline polymer composition of claim 1, wherein the second diol is one or more of hydroquinone, resorcinol, 4-4'-biphenol, 2,6-dihydroxynaphthalene, 1,8-dihydroxynaphthalene, bisphenol-A, and bisphenol-S.

10. The treated liquid crystalline polymer composition of claim 1, wherein the second dial is 4,4-biphenol.

11. The treated liquid crystalline polymer composition of claim 1, wherein the total molar amount of the second difunctional compound does not exceed twice the total amount of the second dicarboxylic acid.

12. The treated liquid crystalline polymer composition of claim 1, wherein a third type of difunctional compound is also present in the treatment composition.

13. The treated liquid crystalline polymer composition of claim 12, wherein the third type of difunctional compound comprises water in the form of a hydrate.

14. The treated liquid crystalline polymer composition of claim 1, wherein the treated liquid crystalline polymer composition exhibits a tensile elongation that is at least about 20% greater than a tensile elongation of the liquid crystalline polymer.

15. The treated liquid crystalline polymer composition of claim 1, wherein the treated liquid crystalline polymer composition exhibits a tensile elongation ranging from 3.4% to 4.1%.

16. The treated liquid crystalline polymer composition of claim 1, wherein the treated liquid crystalline polymer composition exhibits a melt viscosity that is less than the melt viscosity of the liquid crystalline polymer.

17. A shaped part comprising the treated liquid crystalline polymer composition of claim 1.

18. The shaped part of claim 17, wherein the shaped part is an electrical or electronic apparatus, an automotive vehicle part, or a medical device.

19. A film comprising the treated liquid crystalline polymer composition of claim 1.

* * * * *